United States Patent [19]

Hosokawa et al.

[11] Patent Number: 5,806,975
[45] Date of Patent: Sep. 15, 1998

[54] METHOD FOR CONTINUOUS EMULSIFYING ORGANOPOLYSILOXANE GUMS

[75] Inventors: Hidehiko Hosokawa, Crestview Hills, Ky.; Junichi Maeshima, Chiba Prefeture; Fumitaka Suto, Fukui Prefecture, both of Japan

[73] Assignee: Dow Corning Toray Silicone Co., Ltd., Tokyo, Japan

[21] Appl. No.: 736,634

[22] Filed: Oct. 24, 1996

[30] Foreign Application Priority Data

Nov. 1, 1995 [JP] Japan ................................. 7-284909

[51] Int. Cl.⁶ ............................................... B01F 7/18
[52] U.S. Cl. .................................... 366/301; 524/830
[58] Field of Search ............................. 366/301; 524/830

[56] References Cited

U.S. PATENT DOCUMENTS

| | | | |
|---|---|---|---|
| 3,575,382 | 4/1971 | Loomans | 259/2 |
| 4,073,013 | 2/1978 | Blach | 366/301 |
| 5,048,971 | 9/1991 | Wall et al. | 366/85 |
| 5,302,658 | 4/1994 | Gee | 524/732 |
| 5,466,746 | 11/1995 | Geck | 524/837 |
| 5,505,591 | 4/1996 | Tynan | 417/205 |
| 5,520,455 | 5/1996 | Yamada et al. | 366/97 |

FOREIGN PATENT DOCUMENTS 2079300  1/1982  United Kingdom.

*Primary Examiner*—Margaret W. Glass
*Attorney, Agent, or Firm*—James L. DeCesare

[57] ABSTRACT

A method of continuous emulsification that can emulsify high-viscosity organopolysiloxane gums and is capable of continuous mass production. A compounding extruder is used whose barrel 1 contains at least 2 mixing element-equipped shafts 3 installed in parallel. On each shaft elevations and depressions are formed along the axial direction and the elevations and depressions on respective shafts intermesh. Organopolysiloxane gum, emulsifying agent, and water are continuously supplied as starting materials to this compounding extruder, and an organopolysiloxane-in-water emulsion is produced by mixing and homogenizing the starting materials by subjecting them through rotation of the mixing element-equipped shafts to a shearing action at a shear rate of at least 10/second (i.e. 10 reciprocal seconds).

2 Claims, 2 Drawing Sheets

METHOD FOR CONTINUOUS EMULSIFYING ORGANOPOLYSILOXANE GUMS

BACKGROUND OF THE INVENTION

This invention relates to a method for continuously emulsifying organopolysiloxane gums. More particularly, this invention relates to a method that is capable of the continuous emulsification of organopolysiloxane gums that have been difficult to emulsify due to their very high degrees of polymerization.

Emulsions of organopolysiloxanes are widely used in industry as lubricants, release agents including mold-release agents, fiber-treatment agents, glass fiber-treatment agents, cosmetic bases, lustrants, and paint additives. These organopolysiloxane emulsions are prepared by mixing an emulsifying agent and water into a starting fluid organopolysiloxane gum. However, conversion into an emulsion can be a problem as the viscosity of the organopolysiloxane rises, resulting in a corresponding increasing difficulty of emulsification.

Japanese Patent Publication Number Sho 59-51565 [51,565/1984] proposes a method for emulsification of such high-viscosity organopolysiloxanes. This method uses a cylindrical container, and installed therein, a mixing element comprising at least 3 disks placed at fixed intervals on a rotating shaft. Shearing and stirring are conducted by rotation of the mixing element. However, the use of at least 3 disks in this method installed on the rotating shaft coaxially and with a narrow interposed gap, limits the viscosity of organopolysiloxanes that can be mixed across these closely spaced disks, to at most about 70,000 centistokes. It is not practical to emulsify organopolysiloxanes with higher viscosities using this method.

BRIEF SUMMARY OF THE INVENTION

The object of our invention in contrast is to provide a highly productive method for continuous emulsification of organopolysiloxane gums that is capable of continuous mass production, and that can emulsify even high-viscosity organopolysiloxane gums heretofore difficult to emulsify.

These and other objects will become apparent from a consideration of the detailed description.

The reference numbers used in these figures correspond to the various elements as follows: 1 is the barrel, 2 is the rotating shaft, 3 is the mixing element-equipped shaft, 3a is the paddle, 3s is the screw, 4 is the supply port, and 5 is the discharge port.

DETAILED DESCRIPTION

Our invention is characterized by continuously feeding an organopolysiloxane gum, an emulsifying agent, and water, as starting materials into the supply port of a compounding extruder whose barrel contains at least 2 mixing element-equipped shafts installed in parallel. On each shaft, elevations and depressions are formed along the axial direction in alternating sequence, and the elevations and depressions on one shaft intermesh with the elevations and depressions on the second shaft. An organopolysiloxane-in-water emulsion is produced by mixing and homogenizing the starting materials by subjecting them through rotation of the mixing element-equipped shafts to a shearing action at a shear rate of at least 10/second; and discharging the emulsion from the discharge port of the compounding extruder.

Mixed and homogenized emulsions of high-viscosity organopolysiloxane gums can be easily prepared due to application to the starting materials of a shearing action at a shear rate of at least 10/second, and due to the above-described arrangement in which at least 2 mixing element-equipped shafts having elevations and depressions along the axial direction, are installed in parallel within the barrel, and the elevations and depressions on one shaft intermesh with the corresponding elevations and depressions on the second shaft.

The "shear rate" according to our invention is defined by the formula:

$$\text{shear rate Vs (1/sec.)} = V/t$$

wherein V is the peripheral velocity at the outer surface of the mixing element-equipped shaft in cm/sec., and t is the minimum clearance in cm between the outer surface of the mixing element-equipped shaft and the interior wall of the barrel.

Figure 1:
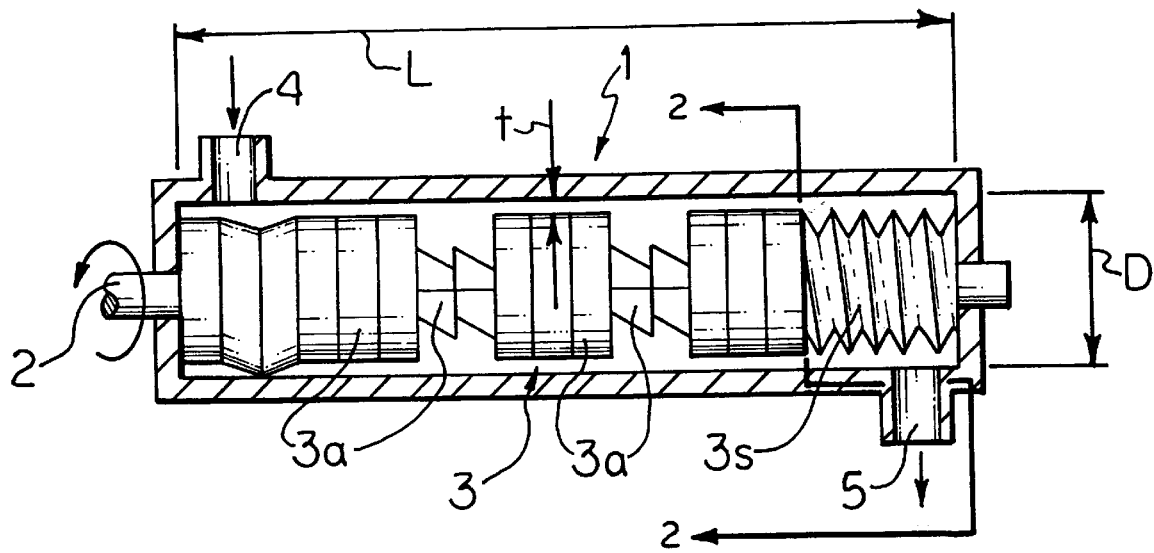
FIG. 1 is a schematic longitudinal cross-sectional view of a compounding extruder used to carry out the method of our invention for continuous emulsification of organopolysiloxane gums.
Figure 2:
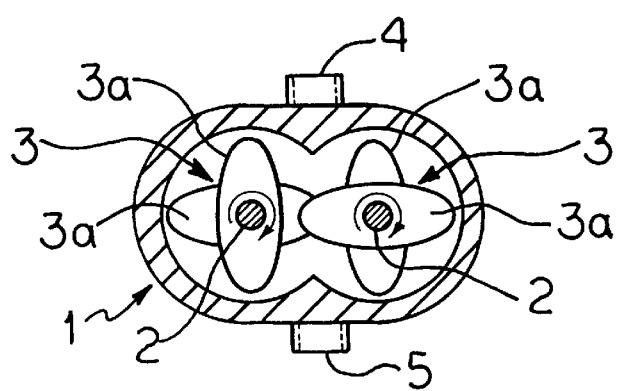
FIG. 2 is a cross-sectional side view taken along section line 2—2 in FIG. 1.

Our method can be explained more fully by reference to the compounding extruder as depicted in the drawings. Thus, FIGS. 1 and 2 depict a compounding extruder for carrying out the method of our invention for continuously emulsifying organopolysiloxane gums. In FIGS. 1 and 2, 1 is a barrel whose axis is fixed on the horizontal, and whose interior space has an 8-shaped transverse cross-section (i.e., transverse cross-section normal to the axial direction). A starting material supply port 4 is fixed to the top of one end of the barrel 1, and a discharge port 5 is fixed at the bottom of the other end of the barrel 1, for discharge of the emulsion made by the mixing operation.

Two mixing element-equipped shafts 3 are inserted in parallel, on the left and right respectively, in the interior space of the barrel 1 with 8-shaped transverse cross-section. These shafts are set up to be driven in the same direction as indicated by the arrows with motors not shown in the drawings.

In the arrangement of these mixing element-equipped shafts 3 moving from upstream at the supply port 4 to downstream at the discharge port 5, a plural number of lens-shaped paddles 3a are first stacked on the rotating shaft 2 moving along the axial direction followed by installation of a screw 3s. The plural number of paddles 3a makes up the major portion of the mixing mechanism. Both ends of the lens-shape lie in close proximity to the interior surface of the barrel 1 and are separated therefrom by a small clearance t. A small clearance t similarly exists for the periphery of the screw 3s.

The paddles 3a are attached on the rotating shaft 2 as groups, consisting in each case of 2–4 paddles with the same angle, and the attachment angle can be changed in 45° increments between the groups. The axial and alternating sequence of elevations and depressions on the mixing element-equipped shaft 3 is formed by changing the phase between the attachment angles of the multi-element groups. In addition, the elevations and depressions formed along the axial direction in alternating sequence on a mixing element-equipped shaft 3, intermesh with the elevations and depressions on a neighboring parallel mixing element-equipped shaft 3.

At least 2 mixing element-equipped shafts 3 must be present, and the elevations and depressions on neighboring shafts must intermesh. Three or more mixing element-equipped shafts may be installed, but the intermeshing relationship must be preserved. The attachment angles of the multi-paddle 3a groups are not necessarily staggered in 45° increments on the rotating shaft 2, and other increments can be used such as 15° or 30°.

In addition to the organopolysiloxane gum, water and the emulsifying agent are also mixed as starting materials in the continuous emulsification of the organopolysiloxane gum using the compounding extruder described above. These three starting materials may be introduced separately into the supply port 4, or they may be preliminarily mixed, and the resulting mixture may be introduced into the supply port 4.

Figure 3A:
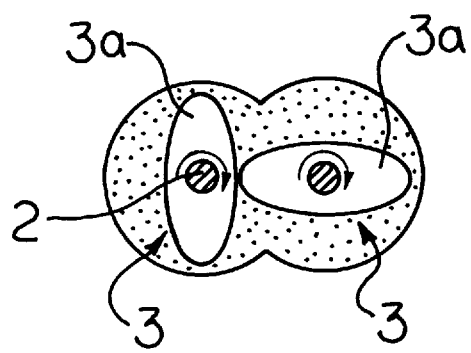
FIGS. 3A, 3B, and 3C are views showing the changes in position of the mixing element-equipped shafts during operation of the compounding extruder of FIG. 1.
Figure 3B:
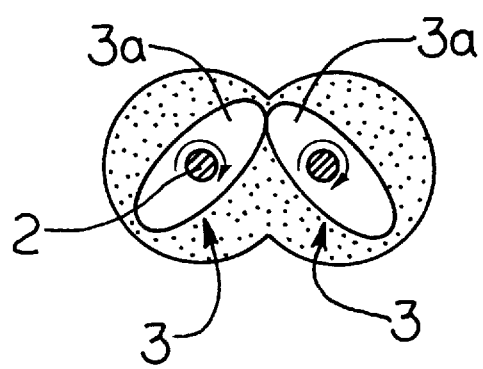
Figure 3C:
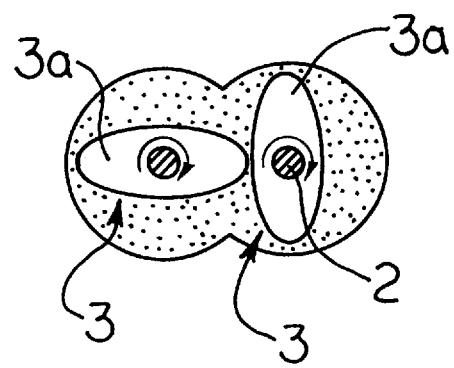

Due to the different attachment angles for the multi-paddle 3a groups on the 2 mixing element-equipped shafts 3, and the elevation/depression intermeshing of reciprocal paddles 3a between the two shafts, the starting materials are subjected to a mixing action and a shearing action within the compounding extruder as the intermesh configuration of the paddles 3a changes as shown in FIGS. 3A–3C. In addition, because both tips of the lens-shaped paddles 3a generate a shearing action by virtue of the small clearance t with the inner wall of the barrel 1, the three starting materials are subjected to additional strong mixing and homogenizing activities that serve to generate a microparticulate emulsion. The mixture thereby emulsified by the paddles 3a is finally discharged through the discharge port 5 while being subjected to additional mixing by the downstream screw 3s.

In applying the mixing action described above, the shear rate in the shearing action (i.e., between paddles and between the paddle tips and barrel interior wall) must be at least 10/sec., and is preferably at least 100/sec. A homogeneous microparticulate emulsion cannot be obtained when the shear rate applied to the mixture is less than 10/sec.

In addition, the compounding extruder is preferably arranged in such a manner that the ratio L/D is at least 5, and more preferably at least 10, wherein L is the axial length of the mixing element-equipped shaft within the barrel 1, and D is the diameter of rotation of the peripheral surface of the paddles 3a. The clearance t between the paddles 3a or screw 3s and the interior wall of the barrel 1 preferably is no greater than 5 mm.

High-viscosity organopolysiloxane gums with viscosities at 25° C. in excess of 500,000 centipoise can be used as the starting organopolysiloxane gum (i.e., Component A) for emulsification in our continuous emulsification method. Even when the viscosity of the organopolysiloxane is higher, it can still be easily emulsified by dissolving it in a solvent.

Any organopolysiloxane which is a gum at ambient temperature can be used. The plasticity of the organopolysiloxane gum is measured at 25° C. by the method described in Japanese Industrial Standard JIS C2123, and is at least 0.75 mm, preferably 1.0–2.5 mm.

Organopolysiloxane gums suitable for our invention can be illustrated by the formula:

$$R_a SiO_{(4-a)/2}$$

wherein R is a substituted or unsubstituted monovalent hydrocarbon group. R can be an alkyl group such as methyl, ethyl, and propyl; an aryl group such as phenyl and tolyl; and such groups in which all or part of the hydrogen has been replaced by halogen, such as chloromethyl and 3,3,3-trifluoropropyl. a has a value from 1.9–2.1.

Such organopolysiloxane gums are exemplified by trimethylsiloxy-endblocked dimethylpolysiloxane gums, silanol-endblocked dimethylpolysiloxane gums, trimethylsiloxy-endblocked dimethylsiloxane-phenylmethylsiloxane copolymer gums, silanol-endblocked dimethylsiloxane-phenylmethylsiloxane copolymer gums, trimethylsiloxy-endblocked dimethylsiloxane-diphenylsiloxane copolymer gums, silanol-endblocked dimethylsiloxane-diphenylsiloxane copolymer gums, trimethylsiloxy-endblocked dimethylsiloxane-methyl (3,3,3-trifluoropropyl)siloxane copolymer gums, and silanol-endblocked dimethylsiloxane-methyl (3,3,3-trifluoropropyl) siloxane copolymer gums.

The molecular structure of the organopolysiloxane gum can be linear, partially branched and linear, or a network. A linear organopolysiloxane gum is preferred.

Additives such as silica micropowder can be present in the organopolysiloxane gum so long as the object of the invention is not compromised.

Water (Component B) can be tap water or ion-exchanged water. Component B is admixed at the rate of 1–400 weight parts per 100 weight parts of organopolysiloxane gum Component A.

Emulsifying agent (Component C) can be a nonionic, anionic, or cationic surfactant. Nonionic surfactants are exemplified by polyoxyalkylene alkyl ethers, polyoxyalkylene alkylphenol ethers, polyoxyalkylene alkyl esters, polyoxyalkylene sorbitan alkyl esters, polypropylene glycol, and diethylene glycol. Anionic surfactants are exemplified by fatty acid salts such as sodium laurate, sodium stearate, sodium oleate, and sodium linolenate; alkylbenzenesulfonic acids such as hexylbenzenesulfonic acid, octylbenzenesulfonic acid, and dodecylbenzenesulfonic acid; salts of the preceding; alkylsulfonates; and sodium polyoxyethylene alkylphenyl ether sulfate. Cationic surfactants are exemplified by octyltrimethylammonium hydroxide, dodecyltrimethylammonium hydroxide, alkyltrimethylammonium chlorides, and benzylammonium salts. Two or more of these surfactants may be used in combination.

Component C is added in sufficient quantity to thoroughly emulsify organopolysiloxane gum Component A in the water Component B. In specific terms, Component C is preferably blended at from 0.1–100 weight parts per 100 weight parts of organopolysiloxane gum Component A.

Organopolysiloxane gum emulsions prepared by our continuous emulsification method are generally obtained in the form of emulsions in which the organopolysiloxane gum is emulsified and dispersed in water. These emulsions generally have an average particle size in the range from 0.1–50 micrometers.

An organopolysiloxane gum emulsion adapted to a particular application or end use can be obtained either by the direct use of the organopolysiloxane gum emulsion as prepared, or by diluting the product with water. These emulsions can be used as fiber-treatment agents, lubricants, release agents including mold-release agents, glass fiber-treatment agents, cosmetic oil bases, lustrants, defoamers, and paint additives.

EXAMPLE

The following ingredients were continuously supplied to the compounding extruder depicted in FIGS. 1 and 2: 100 weight parts of a trimethylsiloxy-endblocked dimethylpolysiloxane gum with a viscosity at 25° C. of 10 million centipoise; 10.0 weight parts polyoxyethylene lauryl ether (i.e., a 6 mol ethylene oxide adduct); and 5.0 weight parts ion-exchanged water. These ingredients were sheared and mixed in the compounding extruder, and yielded an emulsion of the dimethylpolysiloxane gum.

The L/D ratio for the compounding extruder employed was 10 wherein L was the length L of the barrel interior (i.e., the mixing element-equipped shaft) and D was the diameter of rotation of the paddles. The minimum clearance t for this compounding extruder was 0.1 cm. The mixing element-equipped shaft was rotated at 340 rpm, which provided a shear rate of 890/sec.

The dimethylpolysiloxane emulsion was a translucent paste-like emulsion in which the dimethylpolysiloxane gum was uniformly dispersed and emulsified in water. The emulsion contained an average particle size of 9.9 micrometers of dimethylpolysiloxane gum as measured after dilution with water using a laser light scattering instrument for measuring particle size distribution.

As can be seen from the above description, our continuous emulsification method can emulsify high-viscosity organopolysiloxane gums previously difficult to emulsify, and it can accomplish this continuously and efficiently at high levels of production.

Other variations may be made in compounds, compositions, apparatus, and methods described without departing from the essential features of the invention. The forms of invention are exemplary and not limitations on its scope as defined in the claims.

We claim:

1. Apparatus for continuously emulsifying organopolysiloxane gums comprising a compounding extruder having a supply port for continuously feeding an organopolysiloxane gum, an emulsifying agent, and water as starting materials, and a discharge port for discharging an emulsion, the compounding extruder having a barrel with an eight-shaped transverse cross-section, the barrel containing at least two mixing element-equipped shafts arranged in parallel, each shaft having elevations and depressions formed along the axial direction in alternating sequence, the elevations and depressions on one shaft intermeshing with the elevations and depressions on the other shaft; the elevations and depressions being formed by a plurality of lens-shaped paddles on the shafts; the mixing element-equipped shafts including a screw; the lens-shaped paddles being attached on the shafts as groups of 2–4 lens-shaped paddles, each group of paddles having the same angle of attachment, but with the angle of attachment of alternating sequences of paddle groups on each shaft being staggered in different increments of 15°, 30°, or 45°, with respect to one another.

2. Apparatus according to claim 1 wherein the L/D ratio of the shafts is at least five, in which L is the length within the barrel of the shafts and D is the diameter of the shafts.

* * * * *